US012800692B2

(12) United States Patent
Funane et al.

(10) Patent No.: US 12,800,692 B2
(45) Date of Patent: Nov. 17, 2026

(54) ELECTROMAGNETIC WAVE PROCESSING SYSTEM

(71) Applicant: Hitachi, Ltd., Tokyo (JP)

(72) Inventors: Tsukasa Funane, Tokyo (JP); Yosuke Tanabe, Tokyo (JP); Hisatoshi Kimura, Tokyo (JP); Makoto Ito, Tokyo (JP); Koichi Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 18/887,231

(22) Filed: Sep. 17, 2024

(65) Prior Publication Data

US 2025/0110197 A1 Apr. 3, 2025

(30) Foreign Application Priority Data

Oct. 2, 2023 (JP) ................................ 2023-171402

(51) Int. Cl.
*G01S 3/48* (2006.01)
*G01S 5/02* (2010.01)
*H01Q 1/28* (2006.01)

(52) U.S. Cl.
CPC .................. *G01S 3/48* (2013.01); *G01S 5/02* (2013.01); *H01Q 1/288* (2013.01)

(58) Field of Classification Search
CPC .................................... G01S 3/48; G01S 5/02
See application file for complete search history.

(56) References Cited

U.S. PATENT DOCUMENTS

2015/0355312 A1 12/2015 Aymes et al.
2019/0011932 A1* 1/2019 Mcgrath ................ B64G 1/244

FOREIGN PATENT DOCUMENTS

CN 108254718 A 7/2018
JP 2019-056656 A 4/2019
WO WO-8505189 A1 * 11/1985 ........... G01K 11/006

OTHER PUBLICATIONS

Extended European Search Report received in corresponding European Application No. 24203473.4 dated Feb. 27, 2025.

(Continued)

*Primary Examiner* — Timothy A Brainard
*Assistant Examiner* — Helena H Seraydaryan
(74) *Attorney, Agent, or Firm* — MATTINGLY & MALUR, PC

(57) ABSTRACT

An electromagnetic wave processing system mounted on a spacecraft including a plurality of antennas includes: a measurement apparatus configured to process measurement signals of electromagnetic waves acquired by the plurality of antennas; an attitude detection apparatus configured to detect an attitude of the spacecraft; a rotation control apparatus configured to control rotation of the spacecraft; and a calculation apparatus. The rotation control apparatus rotates the spacecraft about a center of gravity around a plurality of rotational axes with respect to an inertial space. The measurement apparatus performs measurement at a plurality of attitudes changed by the rotation. The calculation apparatus calculates an intensity distribution of electromagnetic waves acquired by the plurality of antennas using an interference waveform obtained by multiplying measurement signals obtained from different antennas in the measurement signals obtained at the plurality of attitudes.

11 Claims, 19 Drawing Sheets

(56) References Cited

OTHER PUBLICATIONS

Peet, M., "Spacecraft Dynamics and Control", Lecture 15, Apr. 19, 2020, pp. 16-41.

De Kok, M. et al., "CubeSat Array for Detection of RF Emissions from Exoplanets using Inter-Satellite Optical Communicators", 2020 IEEE Aerospace Conference, 2020, pp. 1-12.

* cited by examiner

FIG. 13

| Name | X [m] | Y [m] | Z [m] |
|---|---|---|---|
| ELECTROMAGNETIC WAVE SOURCE | 0 | 100 | 100 |
| ANTENNA AN1 | B/2 | 0 | 0 |
| ANTENNA AN2 | −B/2 | 0 | 0 |
| ANTENNA AN3 | 0 | B/2 | 0 |
| ANTENNA AN4 | 0 | −B/2 | 0 |
| ANTENNA AN5 | 0 | 0 | B/2 |
| ANTENNA AN6 | 0 | 0 | −B/2 |

ELECTROMAGNETIC WAVE PROCESSING SYSTEM

CLAIM OF PRIORITY

The present application claims priority from Japanese Patent Application JP2023-171402 filed on Oct. 2, 2023, the content of which is hereby incorporated by reference into this application.

BACKGROUND OF THE INVENTION

1. Field of the Invention

The present invention relates to an electromagnetic wave processing system mounted on a spacecraft to observe radio wave sources distributed in all directions on Earth and in outer space.

2. Description of Related Art

In fields of remote sensing in which mobile bodies such as satellites or aircrafts are used, methods of determining locations of electromagnetic wave sources are important techniques. As satellite formation flying and constellation enable wide-area and high-frequency observation, utilization of the techniques is expected. Specifically, in the fields of interferometric radiometers, methods of determining directions in which electromagnetic waves arrive using interferometric processing of signals received by a plurality of antennas by observing phase differences or the like has been proposed.

For example, US2015/0355312A discloses a method of estimating a direction in which a target signal arrives at an array of measurement antennas of satellites on a terrestrial obit. JP2019-56656A discloses a control apparatus that includes a plurality of antennas toward in different directions in a plane and controls movement of a mobile body by searching for electromagnetic wave arrival directions.

Interferometric radiometers mounted on mobile bodies such as artificial satellites (also referred to as "satellites") or aircrafts (hereinafter referred to as "spacecraft" in the invention) perform aperture synthesis processing based on orbital motions of fixed baseline lengths. Since the interferometric radiometers did not utilize rotation (spin) of satellites, there were limitations in observation ranges. For example, it was difficult to simultaneously perform observation in directions of the Earth's surface, including land and sea, and observation in directions of the outer space opposite to the Earth's surface from an Earth orbit. To realize a rotation type radio interferometer that can observe in all directions with only one mobile body, it is necessary to rotate a plurality of antennas mounted on an artificial satellite around any axes and to perform measurement at a plurality of attitudes changed by rotation of the satellite and analysis of measurement signals. However, since US2015/0355312 does not assume that a satellite rotates around any axis, there is no technique related to the problem. JP2019-56656A assumes that antennas are mounted on the flying apparatus and does not disclose a viewpoint at which rotation of a flying apparatus such as a drone is performed on a plurality of axes.

SUMMARY OF THE INVENTION

An object of the invention is to provide an electromagnetic wave processing system capable of performing observation in all directions in only one mobile body.

According to an aspect of the invention, an electromagnetic wave processing system mounted on a spacecraft including a plurality of antennas includes: a measurement apparatus configured to process measurement signals of electromagnetic waves acquired by the plurality of antennas; an attitude detection apparatus configured to detect an attitude of the spacecraft; a rotation control apparatus configured to control rotation of the spacecraft; and a calculation apparatus. The rotation control apparatus rotates the spacecraft about a center of gravity around a plurality of rotational axes with respect to an inertial space. The measurement apparatus performs measurement at a plurality of attitudes changed by the rotation. The calculation apparatus calculates an intensity distribution of electromagnetic waves acquired by the plurality of antennas using an interference waveform obtained by multiplying measurement signals obtained from different antennas in the measurement signals obtained at the plurality of attitudes.

According to the invention, a satellite rotates at various attitudes of a satellite around a plurality of rotation axes and performs measurement at each attitude, which leads to observation performed in all directions in only one mobile body. At this time, it is possible to appropriately control a rotation operation and measurement on a plurality of axes and perform observation in consideration of an attitude state of the satellite.

BRIEF DESCRIPTION OF THE DRAWINGS

FIG. 13 is a diagram illustrating electromagnetic wave sources and position coordinates of antennas;

DESCRIPTION OF EMBODIMENTS

Hereinafter, embodiments of the invention will be described with reference to the drawings.

Embodiment 1

Figure 1:
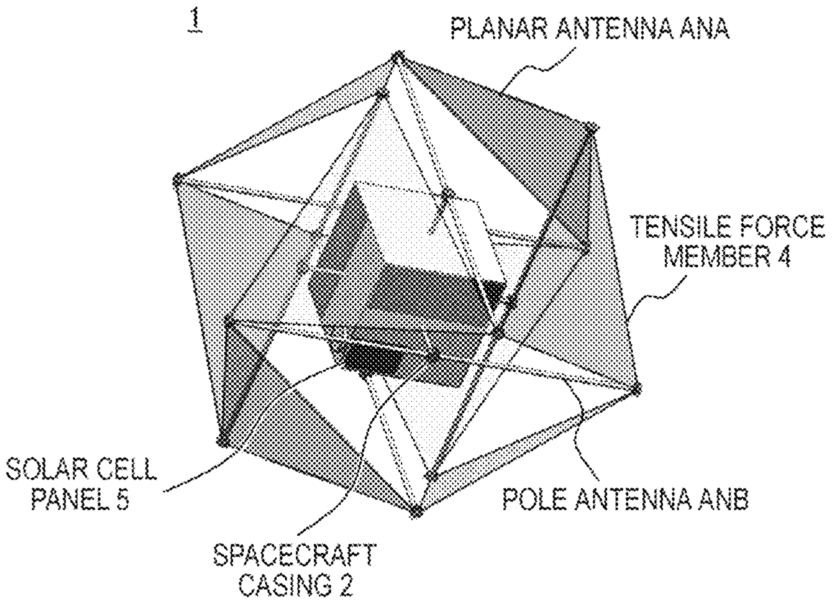
FIG. 1 is a diagram illustrating an overall configuration example of a spacecraft.

FIG. 1 is a diagram illustrating an overall configuration example of a spacecraft. In a spacecraft that is, for example, an artificial satellite, a plurality of antennas AN (a planar antenna ANA and a pole antenna ANB in the illustrated example) are disposed via a tensile force member 4 around a spacecraft casing 2, and a solar cell panel 5 is provided to perform solar photovoltaic generation.

Figure 2:
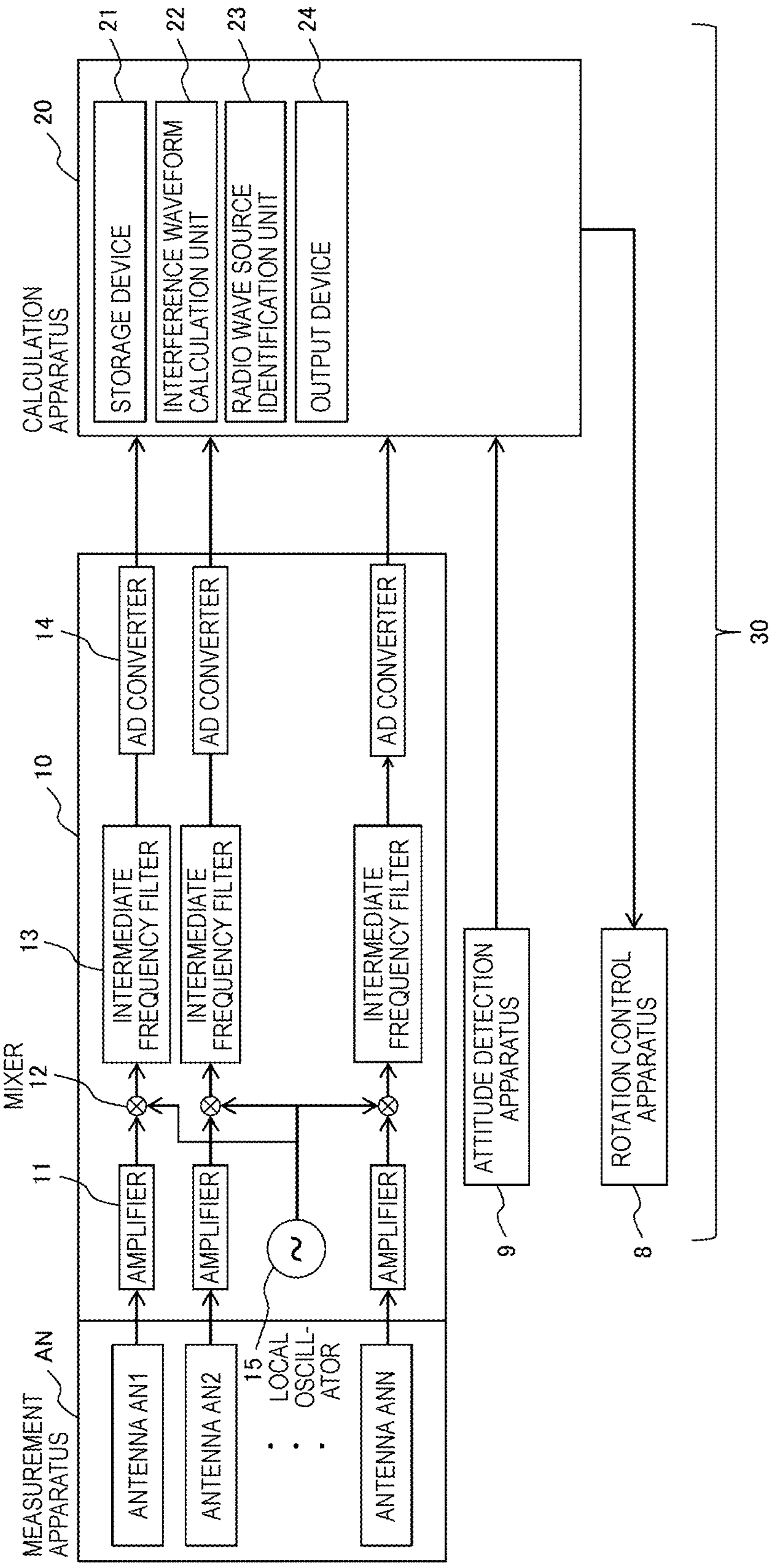
FIG. 2 is a diagram illustrating a basic configuration example of an electromagnetic wave processing system according to Embodiment 1 of the invention.

In the spacecraft 1, an electromagnetic wave processing system 30 exemplified in FIG. 2 is installed in the casing 2. The electromagnetic wave processing system 30 observes radio wave sources distributed in all directions on the ground and an outer space. The solar cell panel 5 supplies power for that reason.

Here, the planar antenna ANA is a patch antenna provided in a thin film form that has three sides formed by the tensile force member 4 (cable) that is a member that has a tensile force. The pole antenna ANB is provided on a compressive member that has a compressive force. The solar cell panel 5 is provided in the middle of the casing 2 of the spacecraft 1 and the solar cell panel 5 is provided on the surface of the casing 2. In the thin film portion, the solar cell panel 5 may be provided at a location at which the planar antenna ANA is not provided.

FIG. 2 is a diagram illustrating a basic configuration example of the electromagnetic wave processing system 30 mounted on a spacecraft 1. The electromagnetic wave processing system 30 includes a plurality of antennas AN (AN1, . . . ANN), a measurement apparatus 10 that processes measurement signals of electromagnetic waves acquired by the plurality of antennas AN, an attitude detection apparatus 9 that detects an attitude of the spacecraft 1, a rotation control apparatus 8 that controls rotation, that is, rotation, of the spacecraft 1, and a calculation apparatus 20 that is configured using a computer.

The attitude detection apparatus 9 includes a star tracker, a sun sensor, an Earth sensor, and a magnetic sensor that determine an attitude of the spacecraft 1. The rotation control device 8 includes a reaction wheel, a momentum wheel, a magnetic torquer, and a thruster. These apparatuses can control an attitude of the spacecraft 1.

In the electromagnetic wave processing system 30 of FIG. 2, the rotation control apparatus 8 rotates a spacecraft about the center of gravity around a plurality of rotational axes with respect to an inertial space, the measurement apparatus 10 performs measurement at a plurality of attitudes changed by the rotation, and the calculation apparatus 20 calculates an intensity distribution of the electromagnetic waves acquired by the plurality of antennas AN using an interference waveform obtained by multiplying the measurement signals obtained from the different antennas AN in the measurement signals obtained at the plurality of attitudes. Attitude control is performed such that the rotation control apparatus 8 is controlled in response to an instruction from the calculation apparatus 20 and the spacecraft 1 is evaluated at an appropriate position.

In the measurement apparatus 10, an amplifier 11 first amplifies each measurement signal of the plurality of antennas AN to perform measurement at the plurality of attitudes changed by the rotation. Like the principle of use with an FM receiver, a difference frequency (intermediate frequency) is extracted by integrating a frequency of a local oscillator 15 with a target frequency by a mixer 12 and applying an intermediate frequency filter 13. A process at the rear stage is facilitated by converting the measurement signals of the plurality of antennas AN into a low frequency in this way. Thereafter, the converted signals are subjected to AD conversion by an AD converter 14 to be input to the calculation apparatus 20.

It is assumed that the process in the measurement apparatus 10 is performed in an analog manner, but a process in the calculation apparatus 20 may be performed by a computer. In this way, the calculation apparatus 20 has functions of a storage device 21, an output device 24, an interference waveform calculation unit 22 that has a processing function of a calculation unit of the computer, and a radio wave source identification unit 23.

Figure 3:
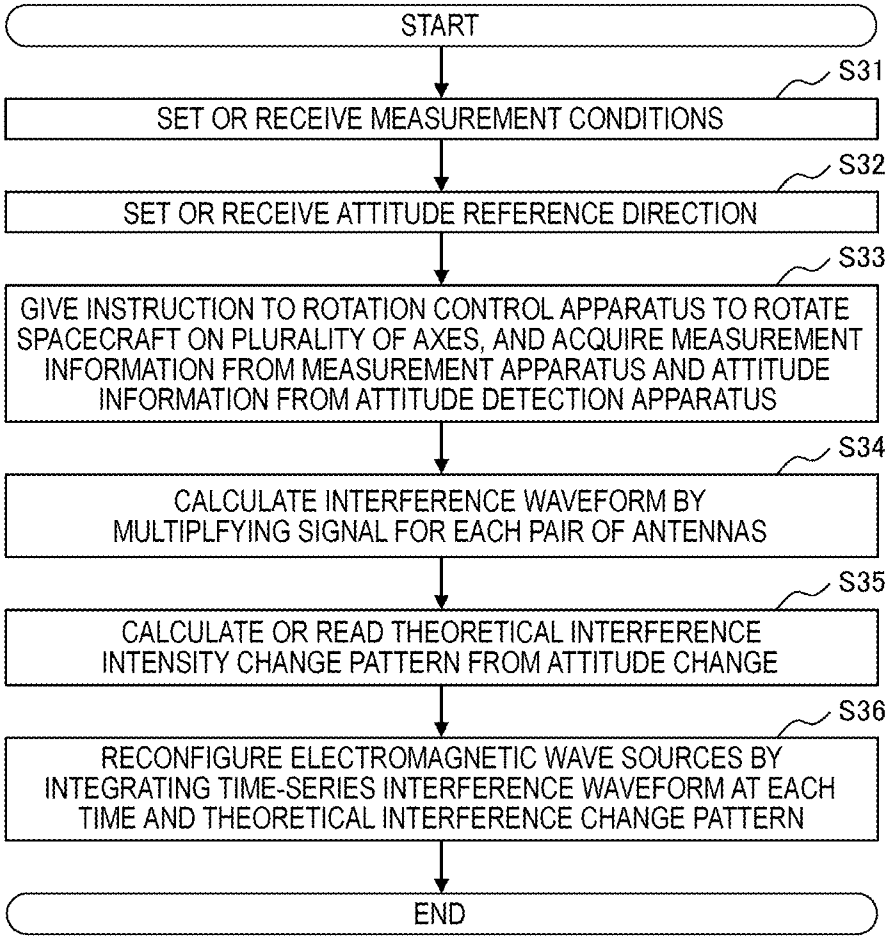
FIG. 3 is a flowchart illustrating an overview of processing content in a calculation apparatus of the electromagnetic wave processing system according to Embodiment 1 of the invention.

FIG. 3 is a flowchart illustrating an overview of processing content in the calculation apparatus 20 of the electromagnetic wave processing system 30. In first processing step S31 of the process in the calculation apparatus 20, measurement conditions are set or received. The measurement conditions include rotational axes during measurement of electromagnetic waves, an order of the rotational axes to be used, and a rotation speed. Predetermined conditions stored in an internal memory or the like of the calculation apparatus 20 may be set in advance or a communicator may be included to the predetermined conditions by receiving a command from an earth station.

Subsequently, in processing step S32, an attitude reference direction is set or received from the outside. The attitude reference direction is an attitude direction of start and end of rotation and is to be the same direction at each rotation to match a measurement start time. For example, a direction in which the x and y axes among the x, y, and z axes defined in a body coordinate system of the spacecraft match the x and y axes of an inertial coordinate system (for example, geocentric coordinate system), including positive and negative directions, can also be set as the attitude reference direction.

Subsequently, in processing step S33, an instruction is given to the rotation control apparatus 8 to rotate the spacecraft 1 around a plurality of axes, and measurement information from the measurement apparatus 10 and attitude information from the attitude detection apparatus 9 are acquired.

In processing step S34, an interference waveform is calculated by associating each piece of attitude and time information with an electric field waveform measured by each antenna AN and multiplying a signal for each pair of antennas.

Subsequently, in processing step S35, a theoretical interference intensity change pattern is calculated or read from an attitude change. Subsequently, in processing step S36, an electromagnetic wave source direction is reconfigured by integrating the interference waveform at each time and the theoretical interference intensity change pattern corresponding to each time in a time direction.

According to the above process, it is possible to perform omnidirectional observation with only one spacecraft. Even when the number of antennas is limited, types of baseline lengths and baseline vectors can be increased by extending the rotational axes of rotation, and thus omnidirectional observation can be performed. The antennas with different directivity patterns can also be combined to acquire polarization information of the electromagnetic wave sources.

A process of the interference waveform calculation unit 22 in FIG. 2 corresponds to processing steps S33 and S34 of FIG. 3, and a process of the radio wave source identification unit 23 corresponds to processing steps S35 and S36 of FIG. 3.

Figure 4:
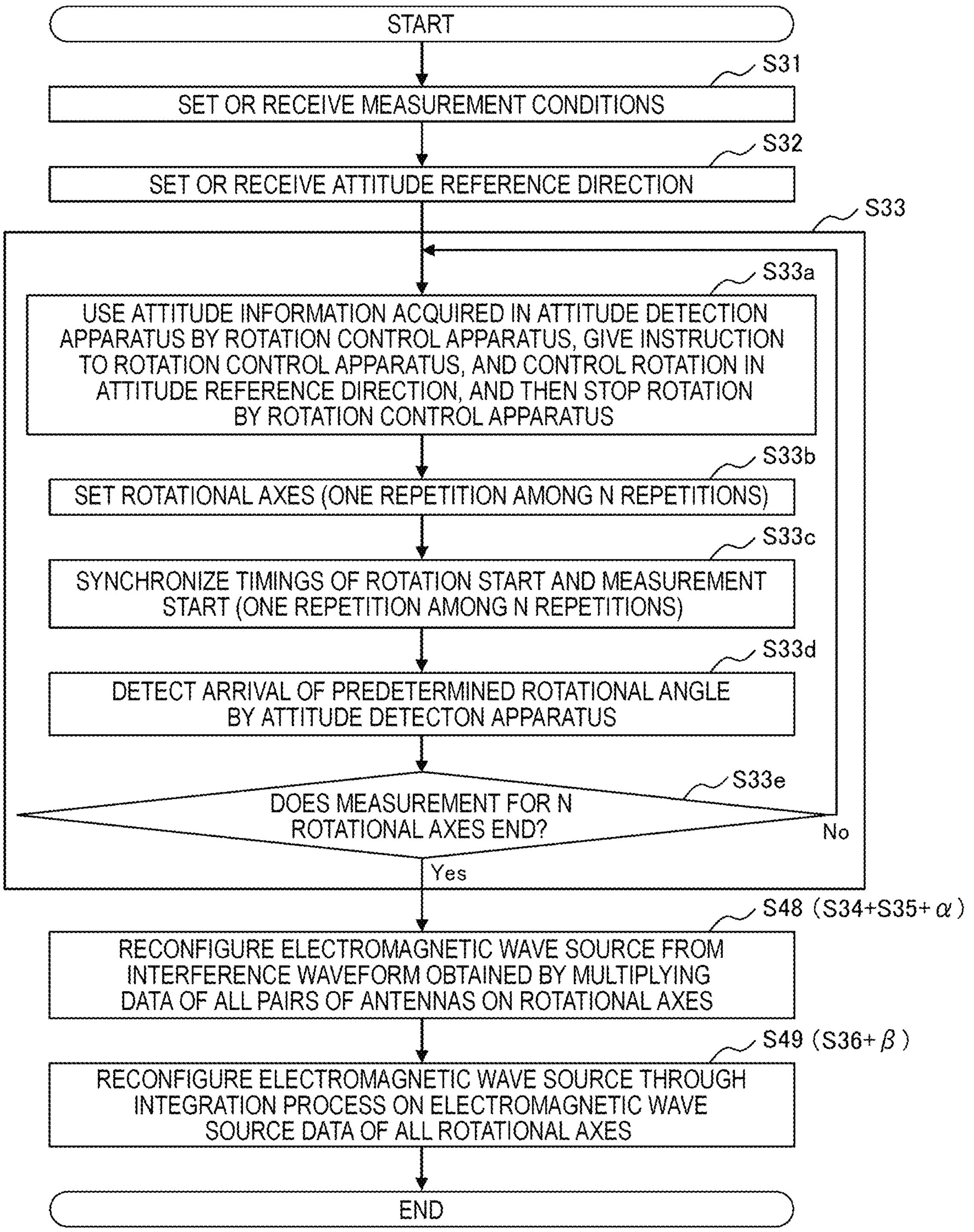
FIG. 4 is a flowchart illustrating a detailed configuration example of content of a rotation measurement process in the calculation apparatus.

FIG. 4 is a flowchart illustrating a detailed configuration example of content of a rotation measurement process in the calculation apparatus 20 of the electromagnetic wave processing system 30. In the example of FIG. 4, the measurement content and the attitude reference direction in processing steps S31 and S32 are obtained. Next, in FIG. 4, as the processing content of processing step S33, a series of procedures during execution of the rotation measurement are described specifically in processing steps S33*a* to S33*e*. In processing step S48, in addition to the processing content of processing steps S34 and S35 of FIG. 3, an item α of description in a frame is added and processed with the rotation measurement. In processing step S49, in addition to the processing content of processing step S36 of FIG. 3, an item β of description in a frame is added and processed with the rotation measurement. In this way, the process of processing step S33 is repeatedly performed while changing the conditions of the rotation measurement and processing steps S48 and S49 are performed as an electromagnetic wave source identification process after the rotation measurement.

The process of processing step S33 will be described specifically. First, in processing step S33*a*, the rotation control apparatus 8 uses the attitude information acquired in the attitude detection apparatus 9, an instruction is given to the rotation control apparatus 8, and the rotation control apparatus 8 controls rotation in the attitude reference direction, and then stop the rotation. In processing step S33*b*, the rotational axes are set for one repetition among N repetitions. In processing step S33*c*, timings of rotation start and measurement start are synchronized for one repetition among N repetitions. Under the conditions, in processing step S33*d*, the attitude detection apparatus 9 detects arrival of a predetermined rotational angle. The processes of the above processing steps S33*a* to S33*d* are continuously performed while changing the conditions until the measurement of N rotational axes ends in processing step S33*e*.

Subsequently, in processing step S48, the process of processing step S34 of FIG. 3 (the interference waveform is calculated by associating each piece of attitude and time information with the electric field waveform measured by each antenna AN and multiplying the signal for each pair of antennas) and the process of processing step S35 (the theoretical interference intensity change pattern is calculated or read from the attitude change) are performed, the process of the item α at that time (the electromagnetic wave source is reconfigured from the interference waveform obtained by multiplying data of all the pairs of antennas on the rotational axes) is performed.

Further, in processing step S49, in addition to the process of processing step S36 of FIG. 3 (the electromagnetic wave source is reconfigured by multiplying the interference waveform at each time and the theoretical interference intensity change pattern corresponding to each time and performing integration in the time direction), the process of the item β is performed (the electromagnetic wave source is reconfigured through integration process on the electromagnetic wave source data of all the rotational axes).

In the specific measurement process illustrated in FIG. 4, in short, the attitude detection apparatus 9 recognizes a rotational angle, then controls start and end of the rotation on the plurality of axes in sequence, and reconfigures the electromagnetic wave source using the interference waveform of the pair of antennas used for analysis on each rotational axis, reconfigures the electromagnetic wave source by matching all the rotational axes, and selects rotational symmetric axes taken as the rotational axes in sequence to perform the rotation.

According to the above process, by determining the rotational axes, it is possible to determine an attitude continuously with high accuracy and acquire measurement data corresponding to each attitude. Further, by rotating around the rotational symmetric axes, stable rotation can be achieved. Since there are many options of the rotational axes, the axes for which cost such as energy consumption is lower can be selected.

Figure 5:
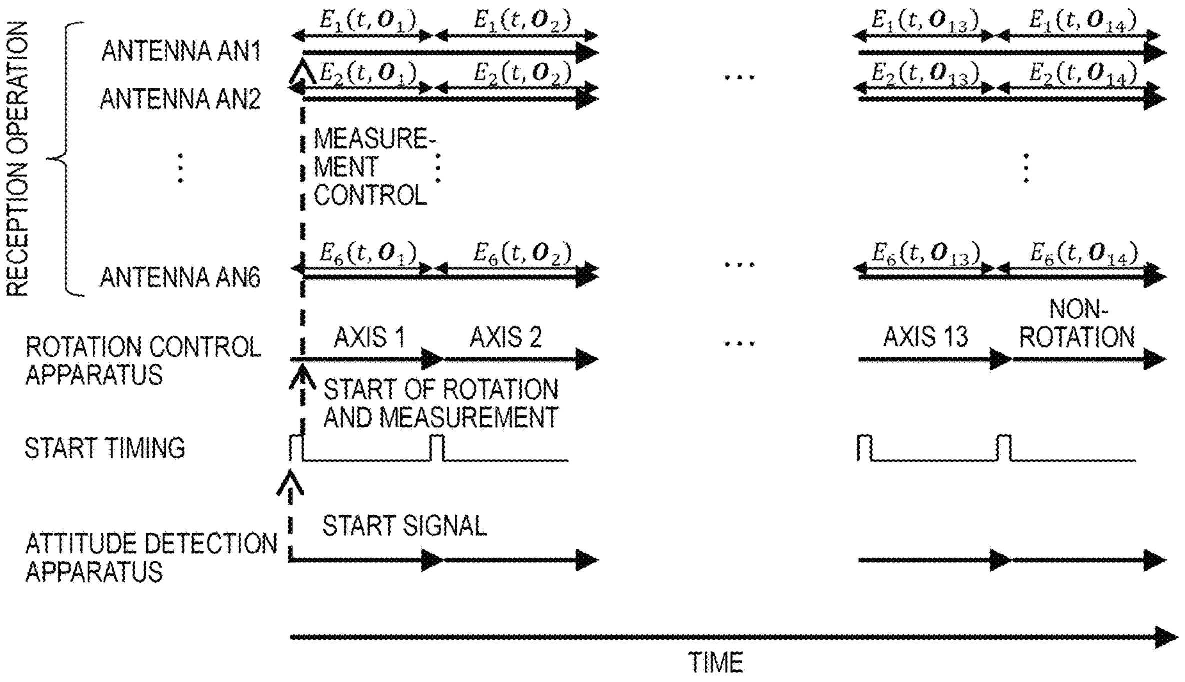
FIG. 5 is a diagram illustrating a time sequence in the measurement process described in FIG. 4.

FIG. 5 is a diagram illustrating a time sequence in the measurement process described in FIG. 4. Here, the horizontal axis represents a time and the vertical axis represents the plurality of antennas AN (here, six antennas AN1 to AN6), axes selected by the rotation control apparatus 8, a start timing, and an output of the attitude detection apparatus 9 in sequence.

Accordingly, the attitude detection apparatus 9 issues a start signal at an appropriate timing over several times and starts rotation and measurement while the rotation control apparatus 8 rotates a rotational axis 1 in accordance with a start timing. At this time, the plurality of antennas AN (here, six antennas AN1 to AN6) obtain electric field waveforms Ex (t, Oy) observed from the antennas X (AN1 to AN6) during a rotational operation Oy.

In similar rotation measurement, rotation and measurement are started at a start timing in response to a start signal from the attitude detection apparatus 9 while rotating a rotational axis 2 at a subsequent time. Even in that time, the electric field waveforms Ex (t, Oy) are obtained in this way. The process of changing the axes are performed in synchronization with the plurality of antennas and the electric field waveforms are measured until the rotation of all the rotational axes is finally completed (until axis 13 in the illustrated case) and becomes non-rotation.

A rotation operation method at that time is assumed that stop (reference attitude)→rotational axis 1→stop (reference attitude)→rotational axis 2→ . . . are repeated or rotational axis 1→transition rotation→rotational axis 1→transition rotation→ . . . are repeated. As the rotation control method, to smooth an acceleration or deceleration speed and inhibit vibration, (differentiation of acceleration=further acceleration=Acceleration/Deceleration of the jerk to below a certain value) or the like may be performed when the rotation is stopped or the rotation is started.

According to the process in the time sequence, data acquired in the plurality of rotation operations can be treated as independent baseline length data, and the baseline lengths in radio wave interference measurement can extend.

Next, a disposition example of the antennas and the baseline length vectors for searching for the electromagnetic wave sources will be described with reference to FIGS. 6 to 8.

Here, a baseline length vector Bij of antennas i-j are changed temporally through a rotation operation Oy (referred to as Bij (t, Oy)), and an interference waveform Bij (t, Oy) is observed by a radio wave phase difference (2πBij(t, Oy)·s/λ arriving from the radio wave source to the antennas i-j.

Figure 6:
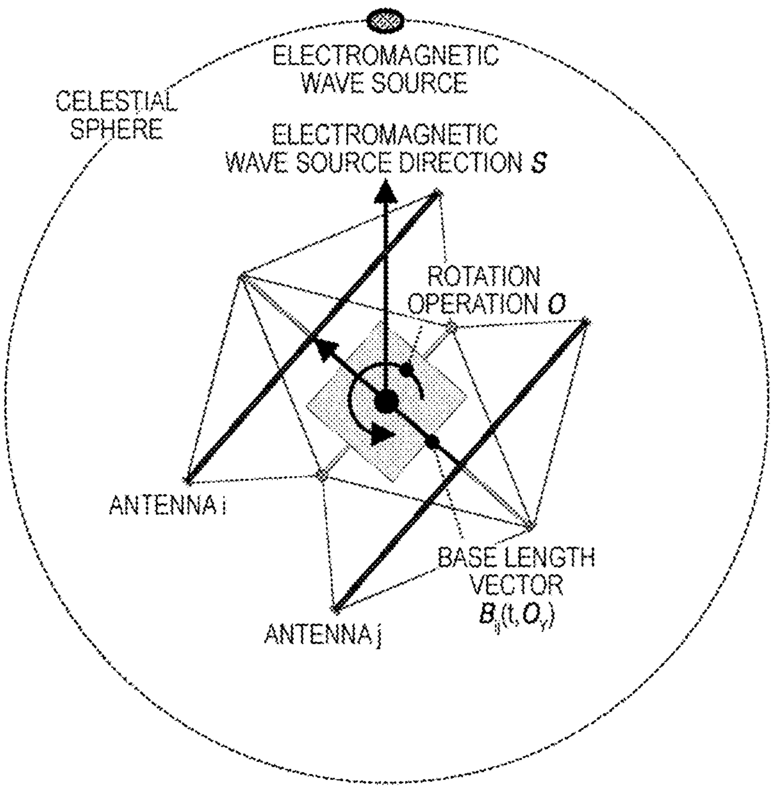
FIG. 6 is a diagram illustrating an antenna configuration and a positional relation between electromagnetic wave sources when rotation measurement is performed.

First, FIG. 6 is a diagram illustrating an antenna configuration and a positional relation between electromagnetic wave sources when rotation measurement is performed in processing step S33 of FIGS. 3 and 4. An observation technique will be described with reference to FIG. 6. Here, for simplicity, an electromagnetic wave source located at a direction vector s from an array antenna is assumed to be still on the surface of a 3-dimensional celestial sphere. The radio interferometer specifies a position of a radio wave source using a strong and weak pattern when electromagnetic waves arriving from the electromagnetic wave sources to the pair of array antennas are interfered and output.

That is, since a rotational angle and an attitude of the spacecraft are changed over time t, a phase difference between antennas occurs in electromagnetic waves arriving due to a difference between a direction vector s of the electromagnetic wave source and Bij(t) called as a distance vector or a baseline length vector between the array antennas (the antennas i and j). Therefore, for example, when it is assumed that the electromagnetic wave source is still at a predetermined position in a point radiation source and observation at the pair of antennas fixed at the predetermined position is assumed, theoretical interference fringes illustrated in FIG. 7 is obtained.

Figure 7:
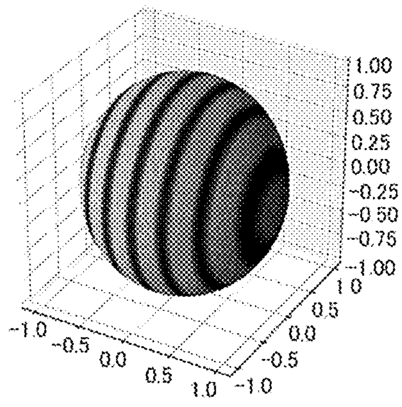
FIG. 7 is a diagram illustrating a theoretical interference change pattern obtained from time-series changes of interference fringes.

FIG. 7 is a diagram illustrating a theoretical interference change pattern obtained from time-series changes of interference fringes in processing step S35 of FIG. 3. When the point radiation source is between lines of the fringes, an interference output observed by the pair of antennas is weak. When the point radiation source is on the line of the fringe, the output is strong. Here, as described above, since the measurement can be performed while the rotation operation is performed on the array antennas, the baseline length vector becomes a function of time. Accordingly, a direction vector of a fringe on the surface of the celestial sphere also becomes a function of time and an interference output consequently becomes strong and weak chronologically due to rotation (fringe pattern).

Figure 8:
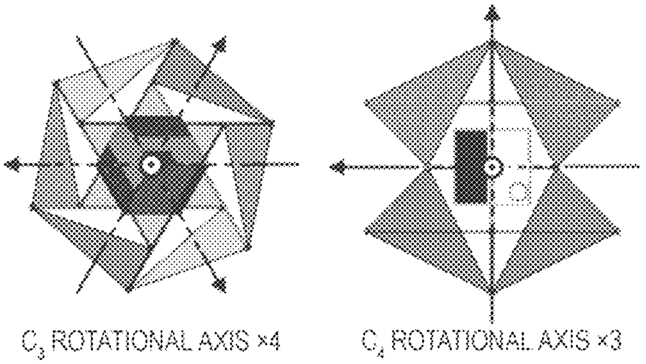
FIG. 8 is a diagram illustrating rotational axes when processing step S33 of FIG. 3 is performed.

FIG. 8 is a diagram illustrating rotational axes when processing step S33 of FIG. 3 is performed. In the case of an array antenna of six channels, $15(={}_6C_2)$ fringe patterns can be obtained. Accordingly, by observing and analyzing a total of 15 fringe patterns through a total of 14 rotation operations, it is possible to map radio wave source directions among 4π steradian solid angles. The total of 14 rotation operations are four C3 rotational axes, three C4 rotational axes, six C2 rotational axes, and a stop, for example, as illustrated in FIG. 8.

Figure 9:
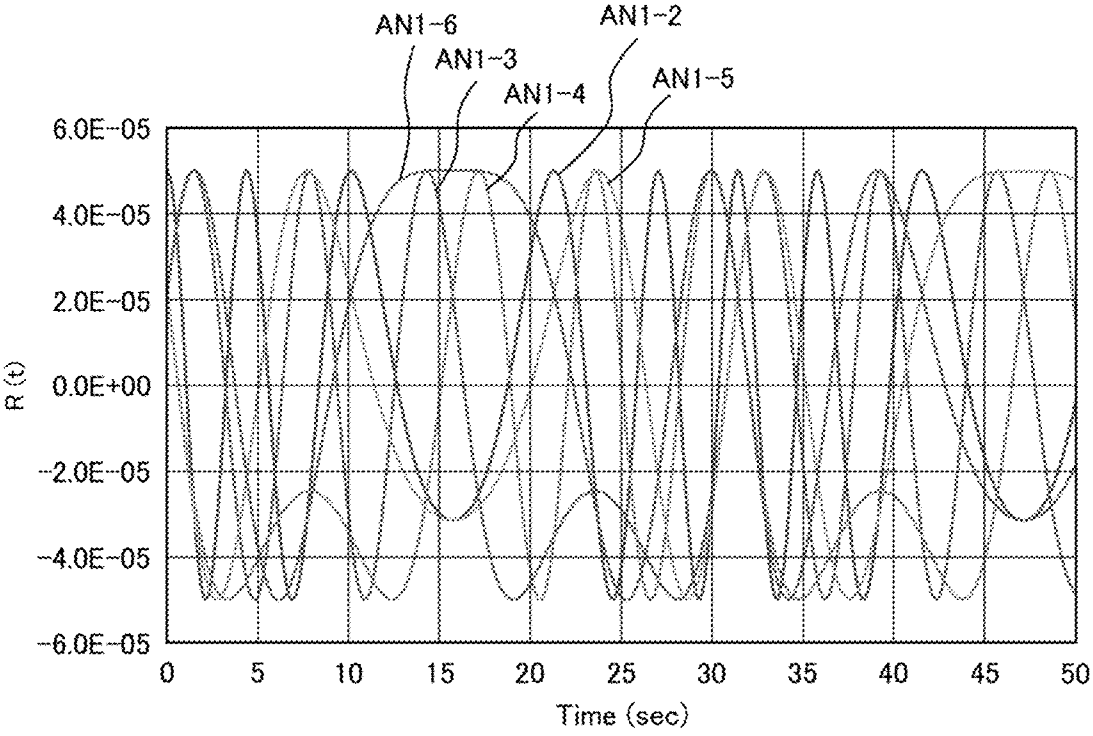
FIG. 9 is a diagram illustrating an example of an interference waveform Rij(t) observed through a process of processing step S34.

An example of the interference waveform Rij(t) observed through the process of processing step S34 is illustrated in FIG. 9. Here, ω=0.1 rad/s and B=0.5 m are set. The interference waveform Rij(t) is an interference waveform related to AN2-6 forming an antenna pair with AN1 and is an interference waveform Rij(t) when AN1-2 indicates a pair of antennas AN1 and AN2.

As in the waveform example, since the interference fringe obtained with the radio wave interference is changed over time with movement of the baseline length vector by rotation, a position of the radio wave source can be identified reversely from this waveform.

Figure 10A:
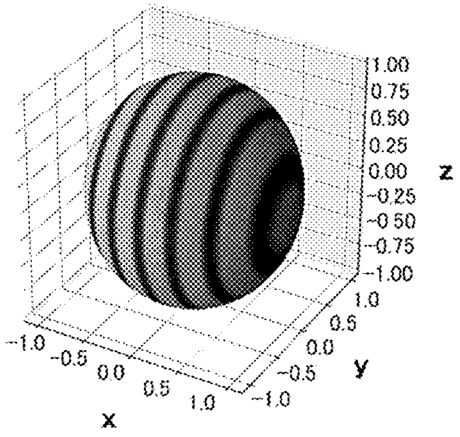
FIGS. 10A to 10D are diagrams illustrating examples of interference fringe maps obtained in a process of processing step S35.
Figure 10B:
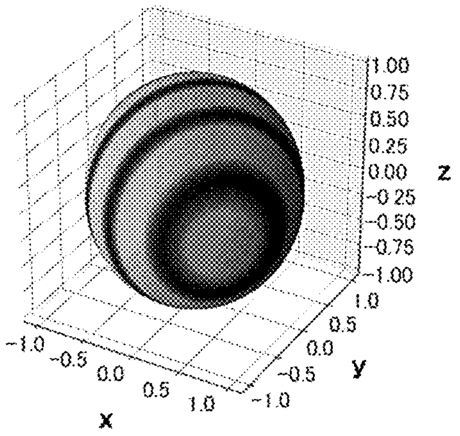
Figure 10C:
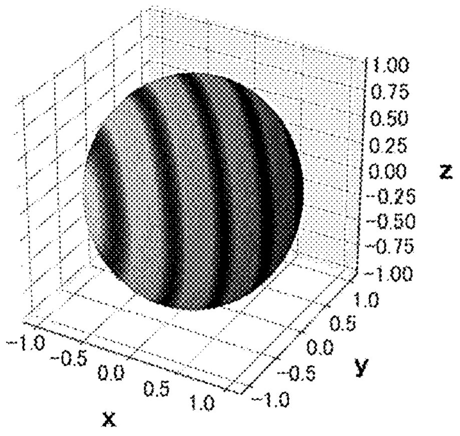
Figure 10D:
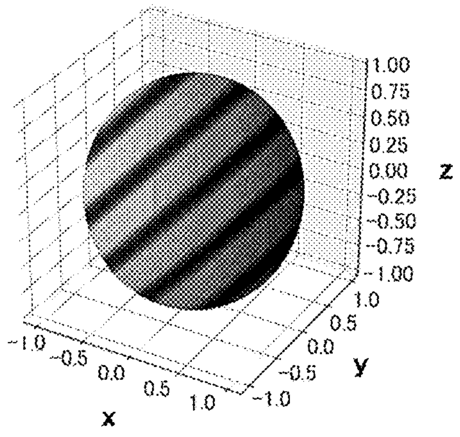

Examples of the interference fringe map obtained through the process of processing step S35 are illustrated in FIGS. 10A to 10D. Here, B=0.5 m is set. FIG. 10A illustrates an interference fringe when the antennas AN1 and AN2 form a pair AN1-2, FIG. 10B illustrates an interference fringe when the antennas AN1 and AN3 form a pair AN1-3, FIG. 10C illustrates an interference fringe when the antennas AN1 and AN4 form a pair AN1-4, and FIG. 10D illustrates an interference fringe when the antennas AN1 and AN5 form a pair AN1-5.

In processing step S35, an electromagnetic wave source (point source) has an azimuth angle θ and an elevation angle φ, a theoretical interference fringe obtained by interference between the antennas i-j through a rotation operation O is defined in Formula (1). This assumes that an antenna pattern is isotropic.

[Math. 1]

$$R_{PSij}(\theta, \phi, t, O) = \cos\left[2\pi B_{ij}(t, O)\cdot s(\theta, \phi, t, O)/\lambda\right] \quad (1)$$

By plotting Formula (1), a space fringe pattern at an initial condition (time t=0) can be visualized. A processing result is exemplified in FIGS. 10A to 10D.

Figure 11:
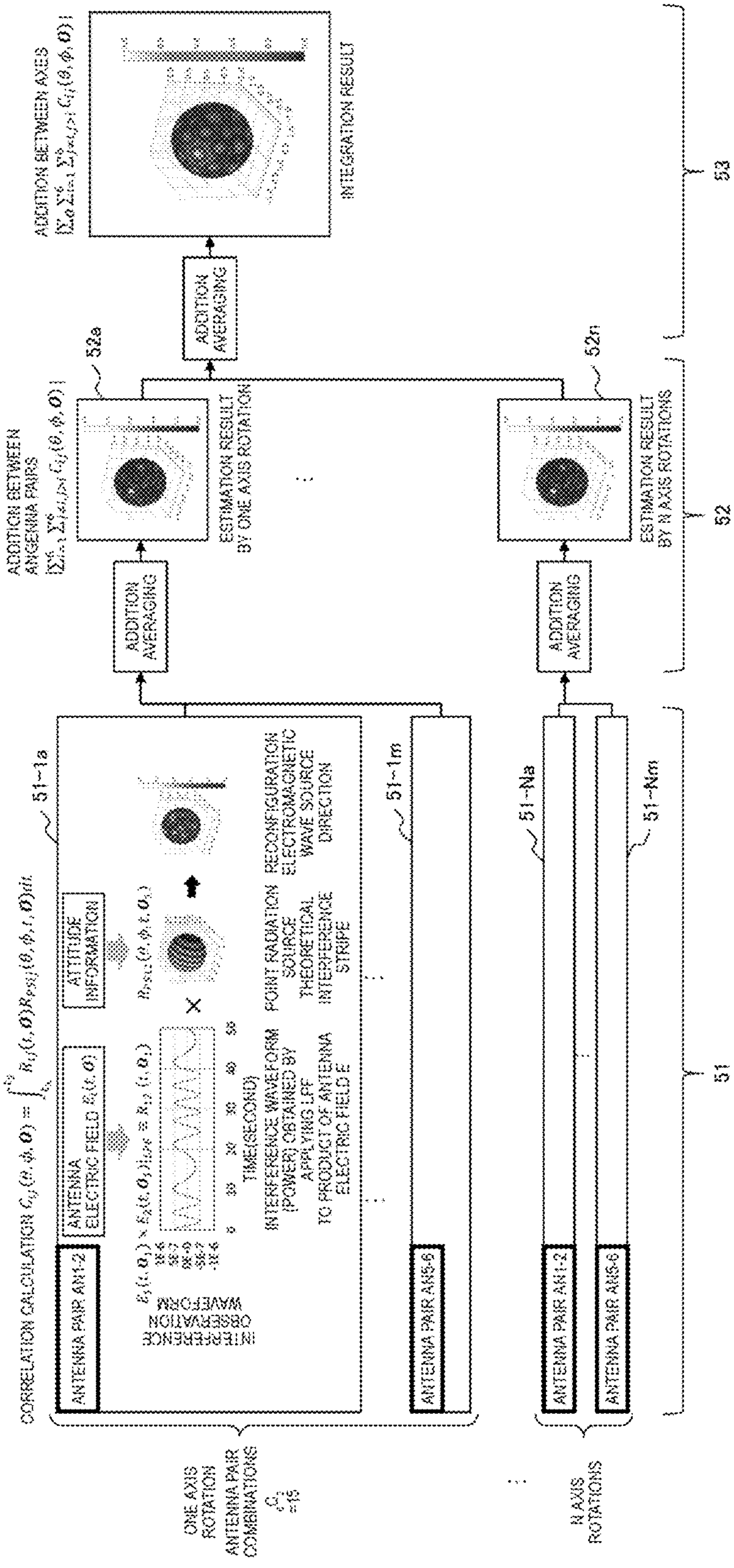
FIG. 11 is a diagram illustrating a processing example of an electromagnetic wave reconfiguration in an electromagnetic wave identification unit in FIG. 2.

The interference fringe (space fringe pattern) of FIGS. 10A to 10D is rotated with rotation of an array. When a dark portion of a stripe pattern in FIGS. 10A and 10D overlaps a position of the electromagnetic wave source, an observation interference waveform increases. As will be described below, an interference stripe map indicated as an integration result in FIG. 11 is a weighting sum of the space patterns illustrated in FIGS. 10A to 10D. An interference stripe (space fringe pattern) can be seen as a spatial basis function indicating a radio wave source distribution.

At this time, an antenna pattern is assumed to be a pattern of a half-wavelength dipole antenna, patch antenna, or the like, directivity (polarization direction) can also be detected in accordance with the pattern. Characteristics of a target can be acquired in the polarization direction.

Next, in processing step S36 of FIG. 3 in which an electromagnetic wave source reconfiguration process in the radio wave source identification unit 23 in FIG. 2 is described, the radio wave source is reconfigured according to the following method using measurement data by the plurality of rotational axes on the assumption that the radio wave source is still. When this process is performed, a product (interference waveform) Rij(t, O) is calculated at each inter-channel in which output data of each antenna stored in the storage device 21 of FIG. 2 is used.

Theoretically, Rij is proportional to an integration of a product of an intensity distribution I (s) and a theoretical intensity $R_{PSij}$ of the radio wave source in an s direction that is unknown in an antenna beam directivity range as in the following Formula (2).

[Math. 2]

$$R_{ij}(t,O) \propto \int_{beam} I(s) R_{PSij}(\theta,\phi,t,O)ds = \int_{beam} I(s)\cos\left[\frac{2\pi}{\lambda} B_{ij}(t,O)\cdot s\right]ds \tag{2}$$

In such a formula, t indicates a time,

O indicates a type of rotation operation (for example, thirteen rotational axes and non-rotation), Rij(t, O) indicates an observation waveform obtained by a product of electric field waveforms between the antennas i-j, Bij(t, O) is a baseline length vector between the antennas i-j, a beam is an integration range (a directivity range of an antenna beam and is spherical from isotropy), I(s) is an intensity distribution of a radio wave source in the vector s direction, and $R_{PSij}$ (θ, φ, t, O) is a theoretical waveform (interference stripe) obtained by interference between the antennas i-j when a radio wave source (a point radiation source or a point source (PS)) is located at an azimuth angle θ and an elevation angle φ.

In Formula (1), the intensity distribution I(s) of the radio wave source is known to be estimated by a correlation Cij of the following Formula (3). That is, the correlation Cij between the interference waveform Rij and the theoretical interference stripe Rps can be calculated to obtain a radio wave source direction configuration pattern.

[Math. 3]

$$C_{ij}(\theta,\phi,O) = \int_{t_1}^{t_2} R_{ij}(t,O) R_{PSij}(\theta,\phi,t,O)dt \tag{3}$$

Here, by calculating Cij(θ, φ, O) at each rotation O, obtaining a total sum of the pairs of all antennas by Formula (4) in processing step S48 of FIG. 4, and obtaining and estimating positions of the radio wave sources by Formula (5) in processing step S49 of FIG. 4 further as the total sum of all the rotational axes, it is possible to improve estimation accuracy.

[Math. 4]

$$\left|\sum_{i=1}^{6}\sum_{j\neq i,j>i}^{6} C_{ij}(\theta,\phi,O)\right| \tag{4}$$

[Math. 5]

$$\left|\sum_{O}\sum_{i=1}^{6}\sum_{j\neq i,j>i}^{6} C_{ij}(\theta,\phi,O)\right| \tag{5}$$

Here, at a location of a time integration, a plurality of peak times located at Rij(t) may be extracted and the time integration at that time may be performed. Here, the method using the correlation has been described, but a method using fast Fourier transform (FFT) may be used. A method in which an input apparatus and a reception apparatus setting a shape or a size of an electromagnetic wave source is provided, and the electromagnetic wave source is reconfigured by deconvoluting the reconfigured electromagnetic wave source may be used. Accordingly, an improvement in direction estimation accuracy is expected.

By reconfiguring the electromagnetic wave source using data acquired through a plurality of rotation operations, as described above, it is possible to further improve accuracy and estimate the electromagnetic wave source.

FIG. 11 is a diagram illustrating a processing example of an electromagnetic wave reconfiguration in the electromagnetic wave identification unit 23 in FIG. 2. A processing unit in FIG. 11 includes a correlation calculation unit 51, an antenna pair addition unit 52, and an inter-axis addition unit 53.

The correlation calculation unit 51 is configured for each antenna pair at each axis rotation and accordingly processes 15 pair combination of all the antennas at one axis rotation. Here, one axis rotation is denoted by 51-1 and further denoted by 51-1*m* to distinguish 15 antenna pair combinations. Here, m is a maximum of 15. N axis rotations are denoted by 51-Na to 51-Nm.

As illustrated, a process of 51-1*a* is indicated as a representative example. The correlation calculation unit 51 consequently executes Formula (3) through the process of processing step S36. Here, a reconfiguration electromagnetic wave source direction is estimated as a product of the antenna electric field Ei(t, O) obtained in processing step S34 and the attitude information $R_{PSij}$ (θ, φ, t, O) obtained in processing step S35.

The antenna electric field Ei(t, O) is obtained as an interference waveform obtained by applying an LPF to the product of the antenna electric field Ei(t, O), and the attitude information $R_{PSij}$ (θ, φ, t, O) is obtained as a point radiation source theoretical interference stripe. The reconfiguration electromagnetic wave source direction can be visualized with light and shade on a spherical surface and can be information that has higher reliability as a brightness difference between a bright portion and a dark portion is larger.

The reconfiguration electromagnetic wave source direction obtained for each antenna pair can be obtained by addition averaging for each axis in the antenna pair addition units 52 (52*a* to 52*m*). This process is obtained by Formula (4) in processing step S48 of FIG. 4.

The reconfiguration electromagnetic wave source direction obtained further through the addition averaging for each axis is subjected to additional averaging by the inter-axis addition unit 53 and is considered as a comprehensive result. This process is obtained by Formula (5) in processing step S49 of FIG. 4.

Details of the processing content will be described below. First, an electric field Ei measured an i-th antenna during k-th rotation depends on an attitude of the spacecraft in accordance with time t and a rotation operation k and is obtained as time-series data of voltage values obtained by an analog-digital (AD) converter at the rear stage of the antennas.

The interference waveform Rij in the pair of i-th antenna and j-th antenna is calculated, for example, by an integration process for electric fields Ei and Ej and application of a lowpass filter (LPF). The interference waveform may be obtained through a calculation process on digital data subjected to AD conversion or may be subjected to AD conversion after an interference waveform is obtained by an analog integration process using a mixer or the like in an electronic circuit and then is passed through a lowpass filter.

Subsequently, a theoretical interference stripe on the assumption of a point radiation source is obtained from the baseline length vectors connecting the antenna pairs or a positional relationship between the antenna pairs obtained from the attitudes of the spacecraft. A theoretical interference stripe in which a pattern is changed chronologically by mapping an interference intensity during arrival of the electromagnetic waves at a predetermined frequency from a point radiation source in each direction (an azimuth angle and an elevation angle) to a spherical surface.

By superimposing the theoretical interference stripe at each time using an interference intensity change at each time as a weight after the above process, it is possible to reconfigure the electromagnetic wave source.

As an effect by the above process, a ghost (artifact) can be reduced by reconfiguring the electromagnetic wave source using data acquired through a plurality of rotation operations. Further, since a decomposable electromagnetic wave source also increases by using rotation, many electromagnetic wave sources can be reconfigured.

Figure 12:
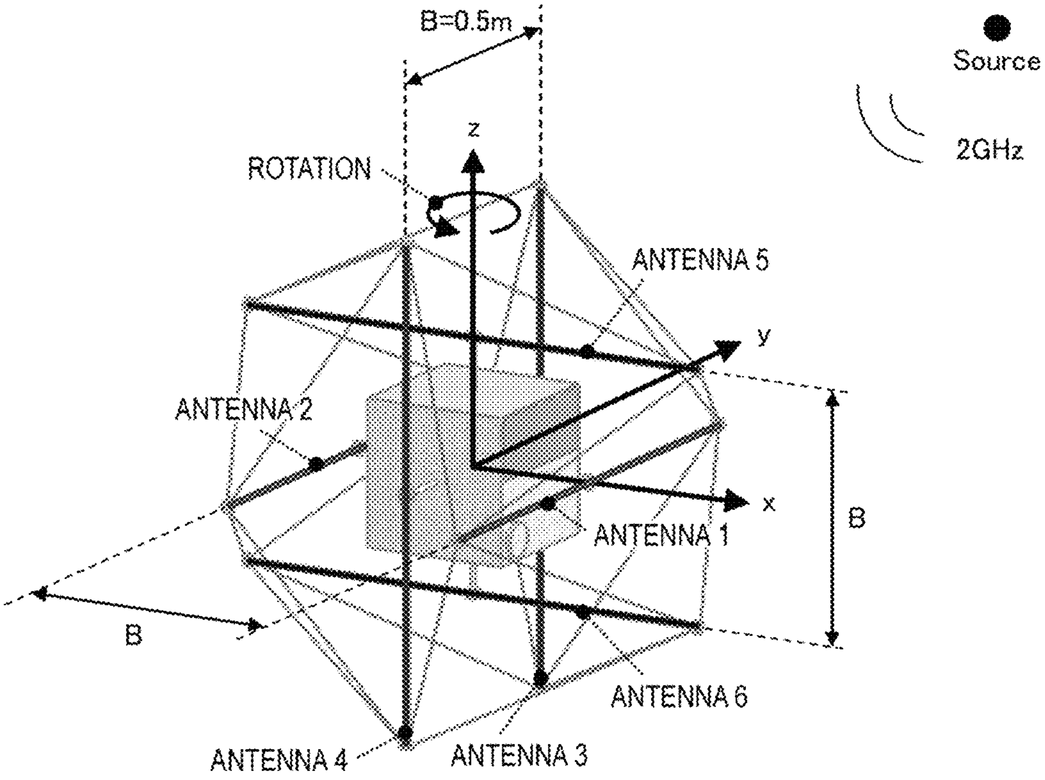
FIG. 12 is a diagram illustrating a simulation setup.

A simulation for searching for electromagnetic wave source by a rotation radio wave interference process and a simulation result according to the above-described invention will be described with reference to FIGS. 12, 13, and 14. Here, a concept is that radio waves are observed while rotating the array antenna, the position of a radio wave source is specified from the interference stripe pattern of each antenna pair, and a simulation setup is a spacecraft including antennas illustrated in FIG. 12. It is assumed that a plurality of antennas are provided in three-dimensional directions (X, Y, Z) and an inter-antenna distance in the same direction is B=0.5 m, and radio waves with 2 GHz from a top right electromagnetic wave source are received.

FIG. 13 is a diagram illustrating electromagnetic wave sources and position coordinates of antennas. In this simulation, the antennas are omnidirectional and the positions of the radio wave sources have an omnidirectional sinusoidal waveform, and the positions of the radio wave sources are still.

Figure 14:
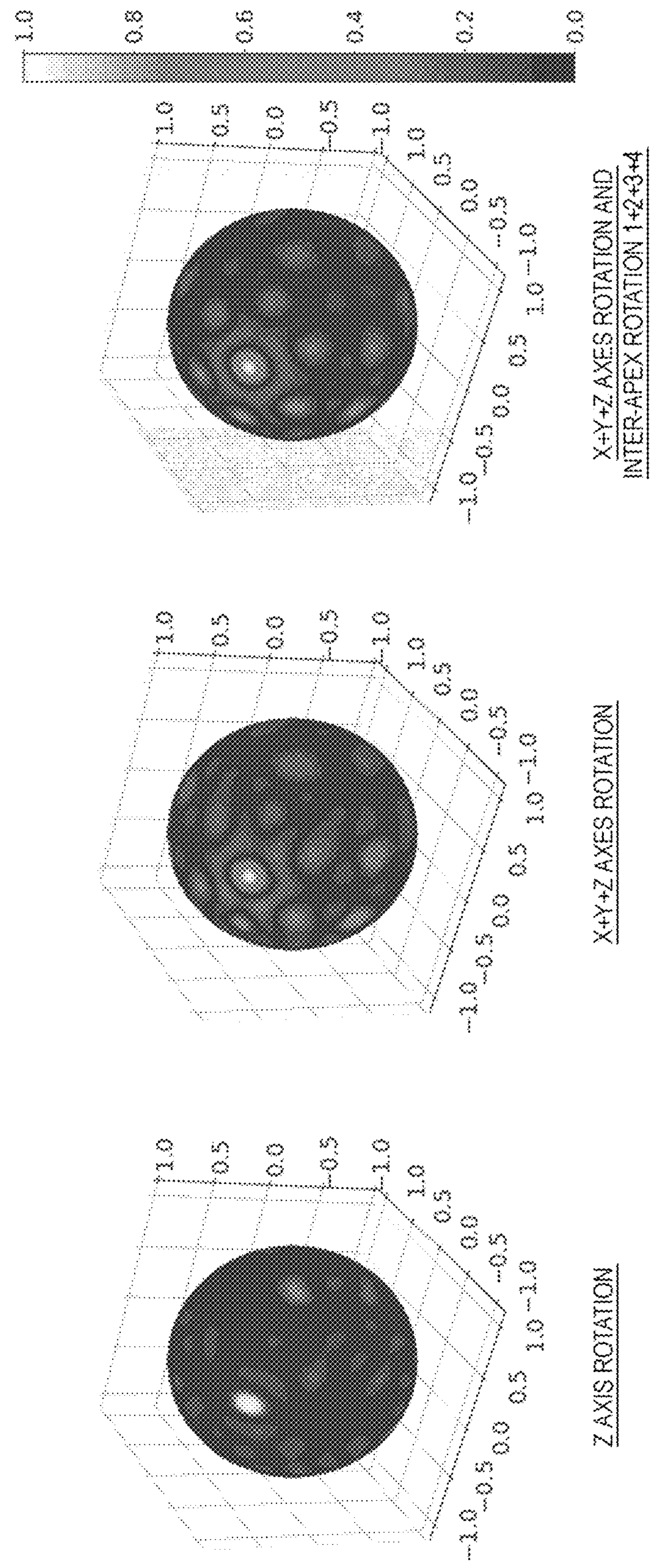
FIG. 14 is a diagram illustrating an electromagnetic wave source position estimation result.

FIG. 14 is a diagram illustrating an electromagnetic wave source position estimation result and illustrates cases of Z axis rotation, three axes rotation, and three axes rotation and inter-apex rotation in order from the left. It is indicated that estimation of higher accuracy is made as light and shade on a celestial sphere is larger. A map of a total sum of correlation coefficients normalized on the surface of a celestial sphere around the spacecraft is displayed (2-dimensional map (θ, φ) may be used). Accordingly, it is considered that positions of the radio wave sources located at an elevation angle of 45 degrees are appropriately estimated. A ghost is reduced and position estimation accuracy is improved by superimposing various rotations.

Figure 15:
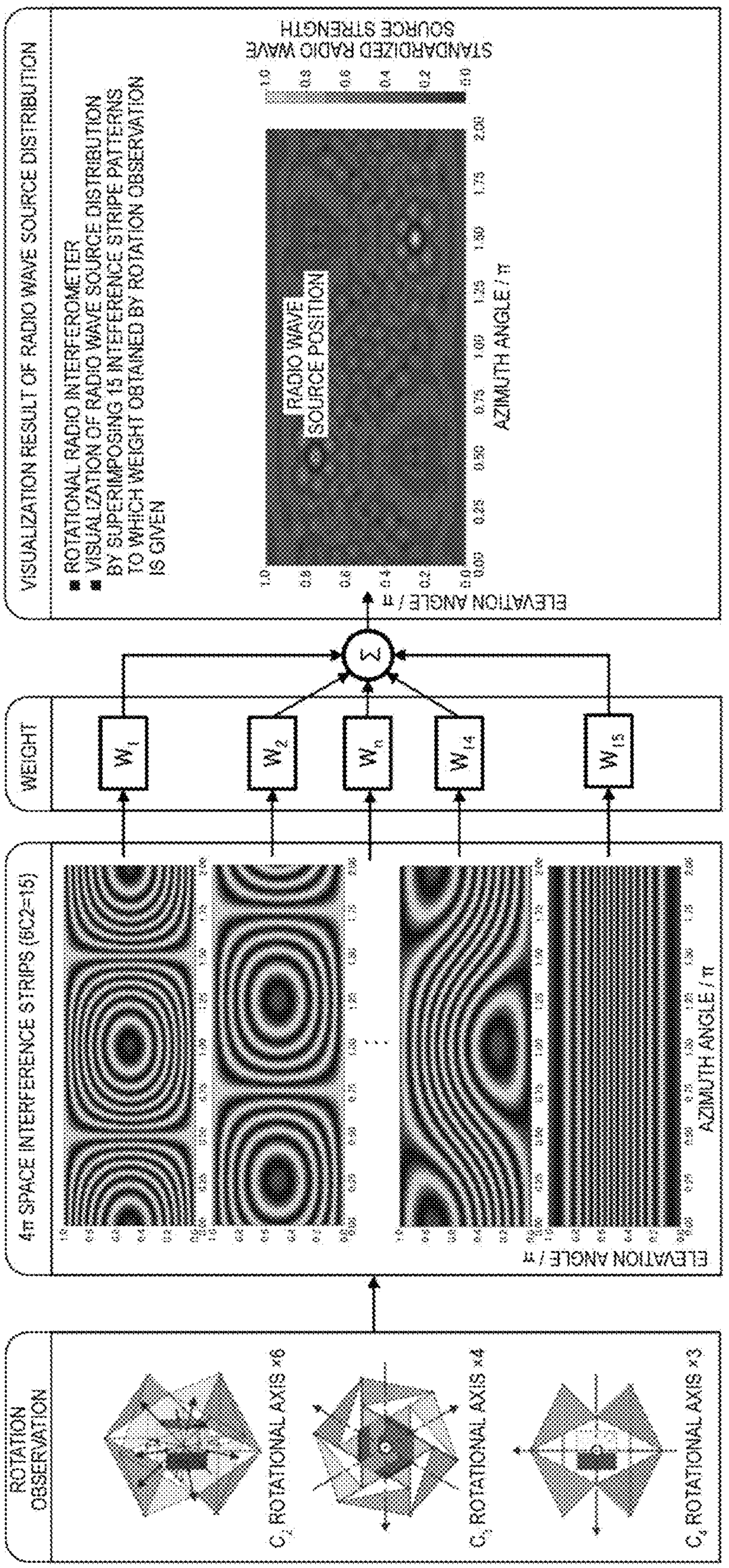
FIG. 15 is a diagram illustrating a simple flow of an electromagnetic wave reconfiguration process and 2-dimensional map generation.
Figure 16:
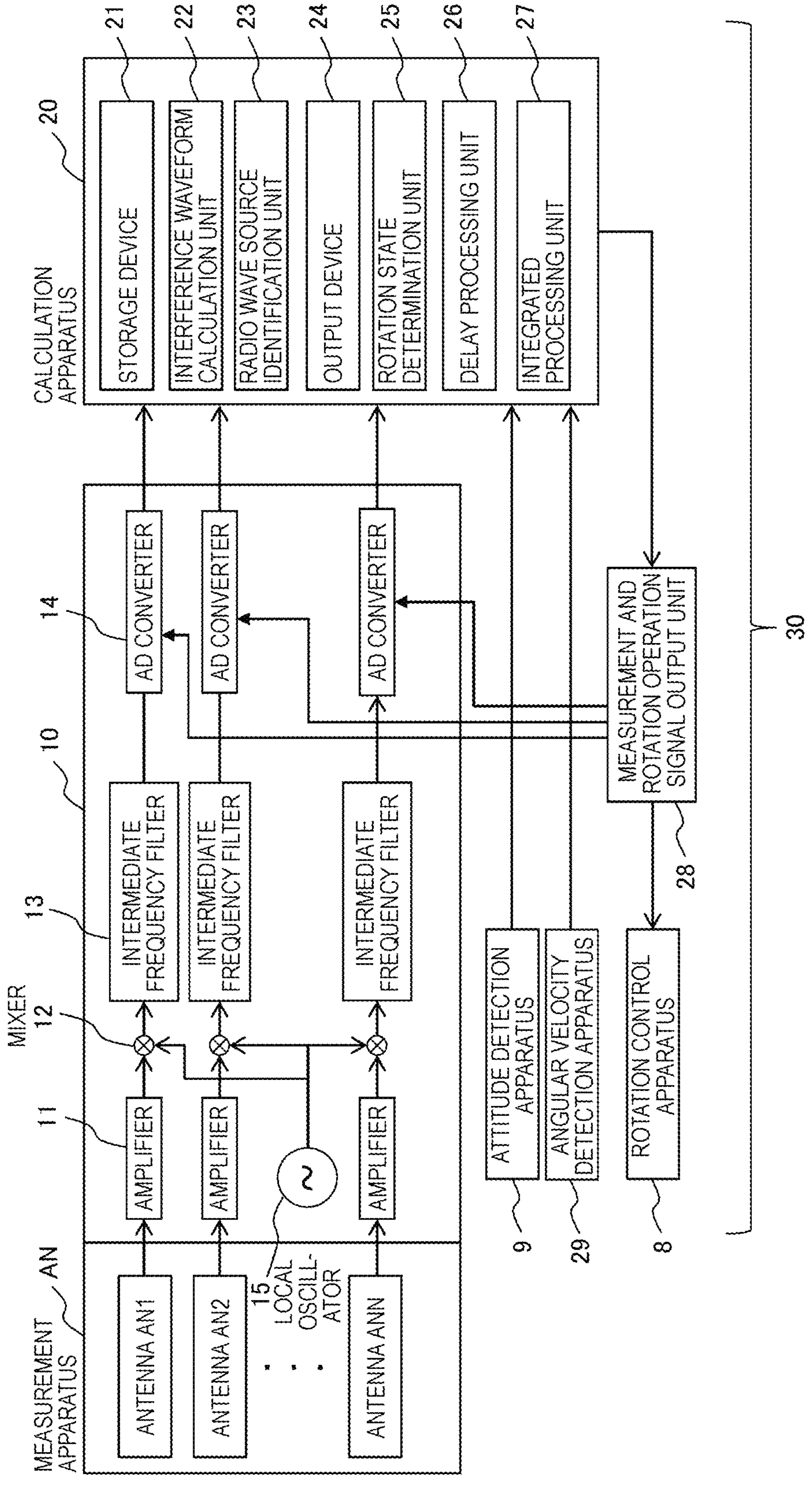
FIG. 16 is a diagram illustrating a basic configuration example of an electromagnetic wave processing system according to Embodiment 2 of the invention.

FIG. 15 is a diagram illustrating a simple flow of an electromagnetic wave reconfiguration process and 2-dimensional map generation. In each of 4π space interference strips ($_6C_2$=15) at attitudes obtained from rotation observation results, an intensity at each attitude of the interference waveform obtained from the same rotation observation result is used as a weight for weighting addition and a visualization result of a radio wave source distribution is obtained.

In this display, an electric field of each antenna is measured in rotation on each rotation axis (thirteen types of axes) and a stop state (one type). In the electric field measurement, a time-series reception intensity acquired in a high frequency reception circuit at the rear stage of the antennas may be subjected to A/D conversion.

At the same time, a time-series attitude change of the spacecraft can be calculated from a reference attitude direction and a rotation start time. A theoretical interference stripe on the assumption of a point radiation source depending on each attitude can be calculated in a 4π space (entire solid space). A theoretical interference stripe displayed in a 2-dimensional map is changed chronologically by calculating, as a function of an azimuth angle and an elevation angle, in which direction a radio wave source is interfered strongly when two types of antenna reception waveforms are interfered at the attitude.

A 2-dimensional radio wave distribution is obtained by superimposing the theoretical interference stripe at a weight of W. Here, an interference intensity (Rij) that changes chronologically may be used as W.

According to the invention, a satellite rotates around a plurality of axes to take various attitudes and performs measurement at each attitude, which leads to execution of omnidirectional observation with only one satellite. At this time, it is possible to appropriately a rotation operation and measurement on the plurality of axes and perform measurement in consideration of the attitude states of the satellite.

Embodiment 2

In Embodiment 2, a factor of an angular velocity is added to the process of Embodiment 1 to perform an estimation scheme with higher accuracy. In comparison with the configuration of FIG. 2 of Embodiment 1, an angular velocity detection apparatus 29 is added as an input, and a rotation state determination unit 25, a delay processing unit 26, and an integrated processing unit 27 of each axis result are added as processes of the calculation apparatus 20. When the rotation control apparatus 8 is driven, a newly added measurement and rotation operation signal output unit 28 adjusts a timing of AD conversion in an AD converter.

In the configuration, the rotation state determination unit 25 of the calculation apparatus 20 can start measurement in a state where an angular velocity reaches a predetermined angular velocity using information regarding the angular velocity detection apparatus 29. The measurement and rotation operation signal output unit 28 can reliably acquire data in which an attitude state and electric field data temporarily correspond by performing measurement control through control on the rotation control apparatus 8 and timing control of the AD converter 14.

The electric field data from each antenna may be converted into a digital signal by AD conversion and the delay processing unit 26 of the calculation apparatus may perform a process of compensating for an influence of delay as necessary. There is the effect that an unnecessary time portion can be deleted and a memory can be reduced.

Figure 17:
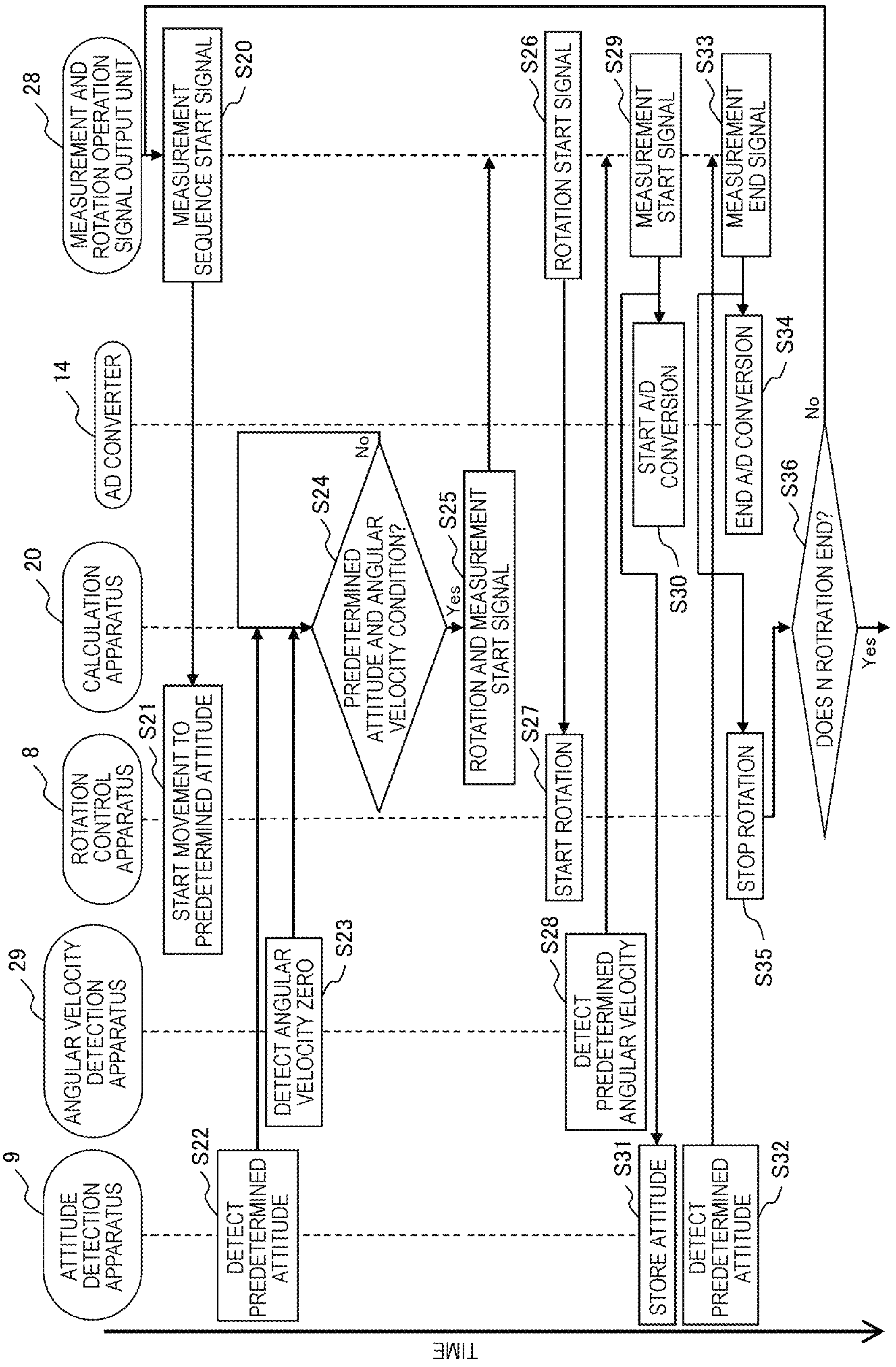
FIG. 17 is a diagram illustrating a time sequence of rotation measurement according to Embodiment 2.

FIG. 17 is a diagram illustrating a time sequence of rotation measurement according to Embodiment 2. Here, each unit and each device involved in control of the present specification are described on the horizontal axis and the vertical axis is a time axis on which a procedure of performing processes of each unit and each device is shown chronologically.

In the chronological procedure, first, the measurement and rotation operation signal output unit 28 issues a measurement start signal (processing step S20) and the rotation control device 8 starts movement to a predetermined attitude (processing step S21). Thereafter, the calculation apparatus 20 determines that predetermined designation and an angular velocity condition are matched (processing step S24) using the predetermined attitude detected by the attitude detection apparatus (processing step S22) and information regarding angular velocity zero detected by the angular velocity detection apparatus (processing step S23). An instruction to start rotation and measurement is given to the measurement and rotation operation signal output unit 28 in accordance with the condition matching (processing step S25), the measurement and rotation operation signal output unit 28 gives the rotation start to the rotation control apparatus 8 (processing step S26), and the rotation control apparatus 8 starts rotation (processing step S27). That is, the measurement and rotation operation signal output unit 28 determines that the attitude is still and the attitude is a predetermined reference attitude, and then synchronizes and output a measurement signal and a rotation start signal. Accordingly, there are effects that measurement conditions can be set equally even for data between different rotation operations and an interference operation can be easily performed between the pieces of data of the different rotation operations.

Accordingly, when the angular velocity detection apparatus 29 detects a predetermined angular velocity as a control result of the rotation control apparatus 8 (processing step S28), the measurement and rotation operation signal output unit 28 issues a measurement start signal (processing step S29), the attitude detection apparatus 9 stores the attitude (processing step S31), and the AD converter 14 starts the AD conversion (processing step S30). For example, the measurement and rotation operation signal output unit 28 determines that predetermined stability is maintained at the number of rotations that is a predetermined number of rotations, and then outputs the measurement start signal. Accordingly, there is an effect that stable data acquisition in the radio wave measurement can be maintained.

Thereafter, in the attitude detection apparatus 9, when the predetermined attitude is detected (processing step S32), the measurement and rotation operation signal output unit 28 issues a measurement end signal (processing step S33), the rotation control apparatus 8 stops the rotation (processing step S35), and the Ad converter 14 ends the AD conversion (processing step S34). When the rotation control apparatus 8 stops the rotation (processing step S35), the calculation apparatus 20 repeatedly performs the above series of processes until end of the rotation of N axes (processing step S36).

Embodiment 3

In Embodiment 3, a method of identifying a movement electromagnetic wave source will be described. The identification process is performed in three steps.

In step 1, an observation interference waveform (interference stripe) is observed. An electric field product is obtained from an electric field Ei (t, O) by Formula (6). Here, I(s) is an electric field source intensity distribution (unknown amount) on a celestial sphere.

[Math. 6]

$$R_{ij}(t, O)\left[ = \int I(s)\cos\{2\pi B_{ij}(t, O)\cdot s/\lambda\}ds\right] \tag{6}$$

In step 2, a running correlation coefficient is calculated. When an electromagnetic wave source is fixed, integration is performed to obtain a correlation for a whole time. When the electromagnetic wave source is moved, the electromagnetic wave source is continuously measured by performing integration for only a predetermined period, obtaining the electromagnetic wave source, and temporarily shifting a window function of determining the period. An integration width at that time is weighted by the window function. The window function is a square window (or a rectangular window), a Hanning window, a Hamming window, a Gauss window, or the like.

[Math. 7]

$$C_{ij}(\theta, \phi, \tau, O) = \int_{t_1}^{t_2} R_{ij}(t, O)R_{PSij}(\theta, \phi, t, O)w(t-\tau)dt \tag{7}$$

Formula (7) is this example.

In Formula (7), Rij(t, O) is an interference stripe obtained by interference between the antennas i-j in a rotation operation O, $R_{PSij}$ (θ, φ, t, O) is a theoretical interference strip obtained by interference between the antennas i-j in the rotation operation O when a radio wave source (a point source) is located at an azimuth angle (azimuth) 6 and an elevation angle (elevation) p, and W(t) is an observation window function (applied to a moving radio wave source) and is omitted when the radio wave source is fixed. The window function may be a square window (or a rectangular window), a Hanning window, a Hamming window, a Gauss window, or the like. At a location of a time integration in a simulation, a plurality of peak times located at the time-series interference intensity Rij(t) are extracted and the time integration at that time is performed.

In step 3, a total sum of correlation coefficients is obtained by, for example, Formula (8).

[Math. 8]

$$\left|\sum_{O}\sum_{i=1}^{6}\sum_{j\neq i, j>i}^{6} C_{ij}(\theta, \phi, \tau, O)\right| \tag{8}$$

Figure 18:
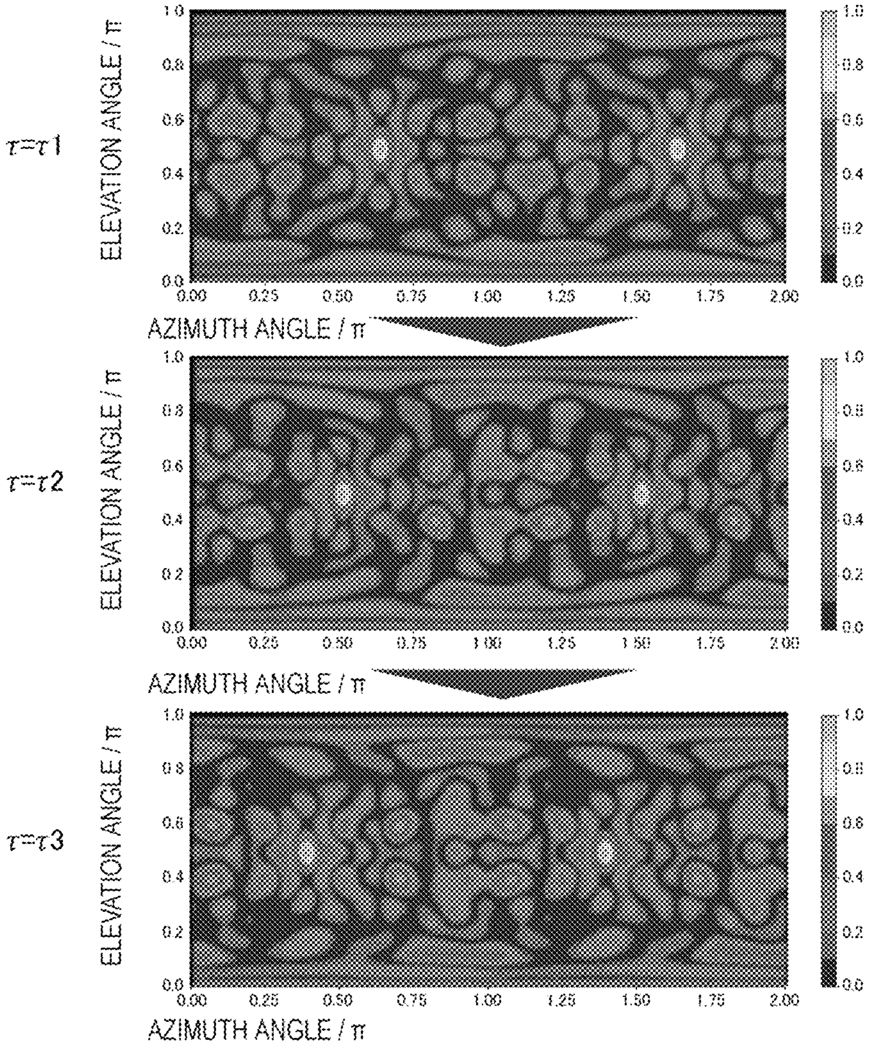
FIG. 18 is a diagram illustrating a detection example of movement electromagnetic wave sources.

FIG. 18 is a diagram illustrating a detection example of movement electromagnetic wave sources. In the case of a still radio wave source, analysis is performed using a whole time, but the time is partitioned for the analysis. Here, a relation between an azimuth angle/π of the horizontal axis and an elevation angle/π of the vertical axis is shown, it is observed that an azimuth angle/π of a bright point when a time has passed sequentially from the above is shifted to the left. Accordingly, a speed of the moving electromagnetic wave source can also be estimated.

Embodiment 4

In Embodiment 4, a method of tracking a target of which rough searching is switched to detail searching by combining antennas of different spatial resolution or directivity functions will be described.

Here, the target is tracked using a large-opening antenna array (path antenna array) (high resolution) of a film surface portion after a target is narrowed from omnidirectional observation by an antenna array (for example, a dipole antenna, a monopole antenna, or the like) of a beam member.

Figure 19:
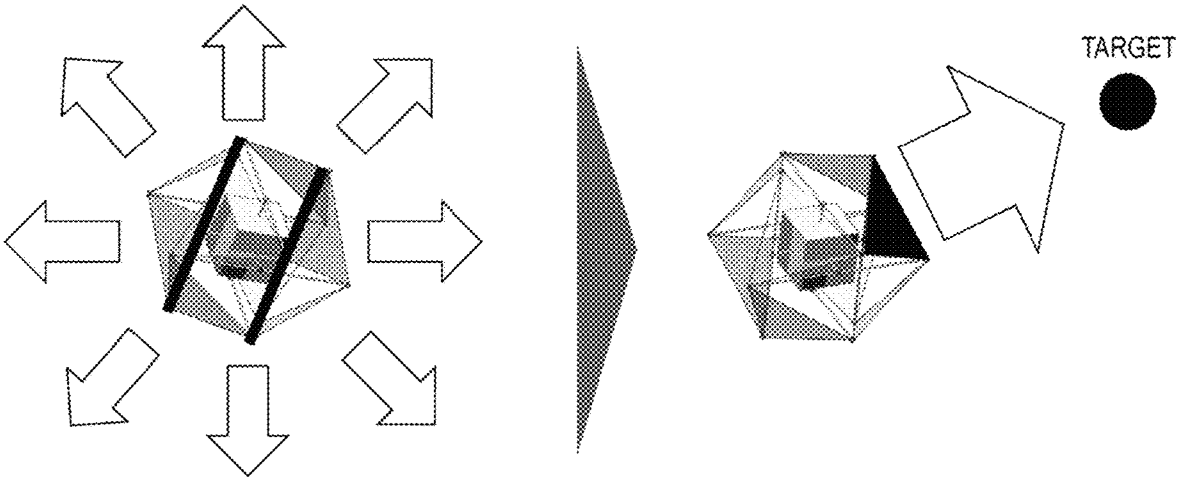
FIG. 19 is a diagram illustrating a scheme of tracking the movement electromagnetic wave sources.

FIG. 19 is a diagram illustrating a tracking scheme. The spacecraft 1 performs rotation, measurement control, and omnidirectional observation as omnidirectional observation by a beam member antenna on the left side and shifts to detail observation (target-oriented control) by a film surface antenna as illustrated on the right side.

According to Embodiment 4, by switching the rough searching to the detail searching by the dipole antenna, it is possible to increase a gain for the target and perform searching of the radio wave source more efficiently and quickly.

Embodiment 5

In Embodiment 5, extension of baseline lengths by a combining formation types (improvement in angle resolution) will be described.

Therefore, in Embodiment 5, spacecrafts are formed and measurement for extending baseline lengths between the spacecrafts (arrival time difference) is combined. Each spacecraft additionally include a radio wave timepiece for time synchronization. Mutual communication is performed to synchronize a time.

Figure 20:
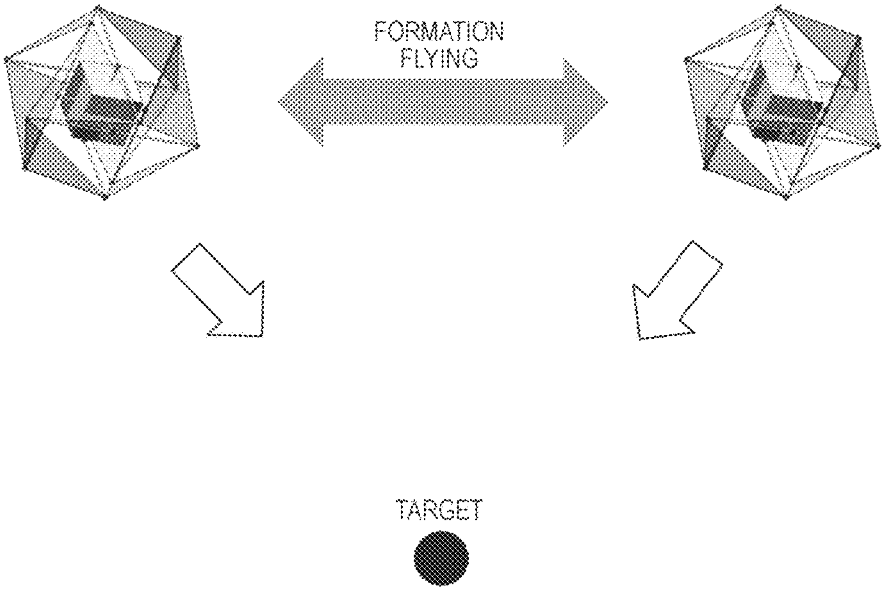
FIG. 20 is a diagram illustrating the same targets during formation flying by a plurality of spacecrafts.

FIG. 20 is a diagram illustrating the same targets during formation flying by the plurality of spacecrafts.

Accordingly, an angle resolution "$\alpha\lambda/B$ (wavelength/baseline length)" can be improved.

Embodiment 6

In Embodiment 6, the number of rotation axes to be used can be selected.

As a resolution, a measurement mode is set to realize faster measurement with minimum necessary rotation based on an input of the number of identified electromagnetic wave sources, and a dispersion value (distribution) and a time change (presence or absence of a target of which a position is temporarily changed) of measurement. A rotation axis at minimum cost is selected from 13 rotation symmetric axes.

Figure 21:
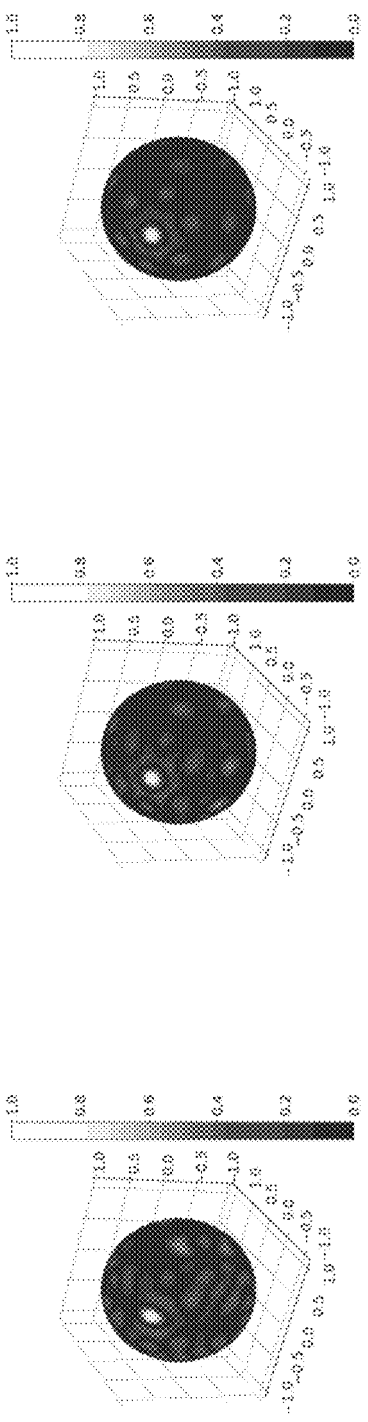
FIG. 21 is a diagram illustrating a measurement result in rotation in which conditions are different.

FIG. 21 is a diagram illustrating a measurement result in rotation in which conditions are different. The left shows a simple and fast measurement mode obtained from a rotation result around the Z axis, and thus an observation result in which asymmetricity remains is obtained. The middle shows a fast measurement mode obtained from a rotation result around three axes of X, Y, and Z, and thus a measurement time can be shortened by minimum measurement on three axes. The right shows a high-accurate measurement mode obtained from a rotation result around four axes of apex diagonal lines in addition to three axes of X, Y, and Z, and thus symmetricity increases by 7 axes-14 axes.

From this, when the number of radio wave sources desired to be measured fast is assumed to be small, rotation is performed on only three axes. When detail measurement is performed, measurement appropriate for a purpose can be performed efficiently.

Embodiment 7

Figure 22:
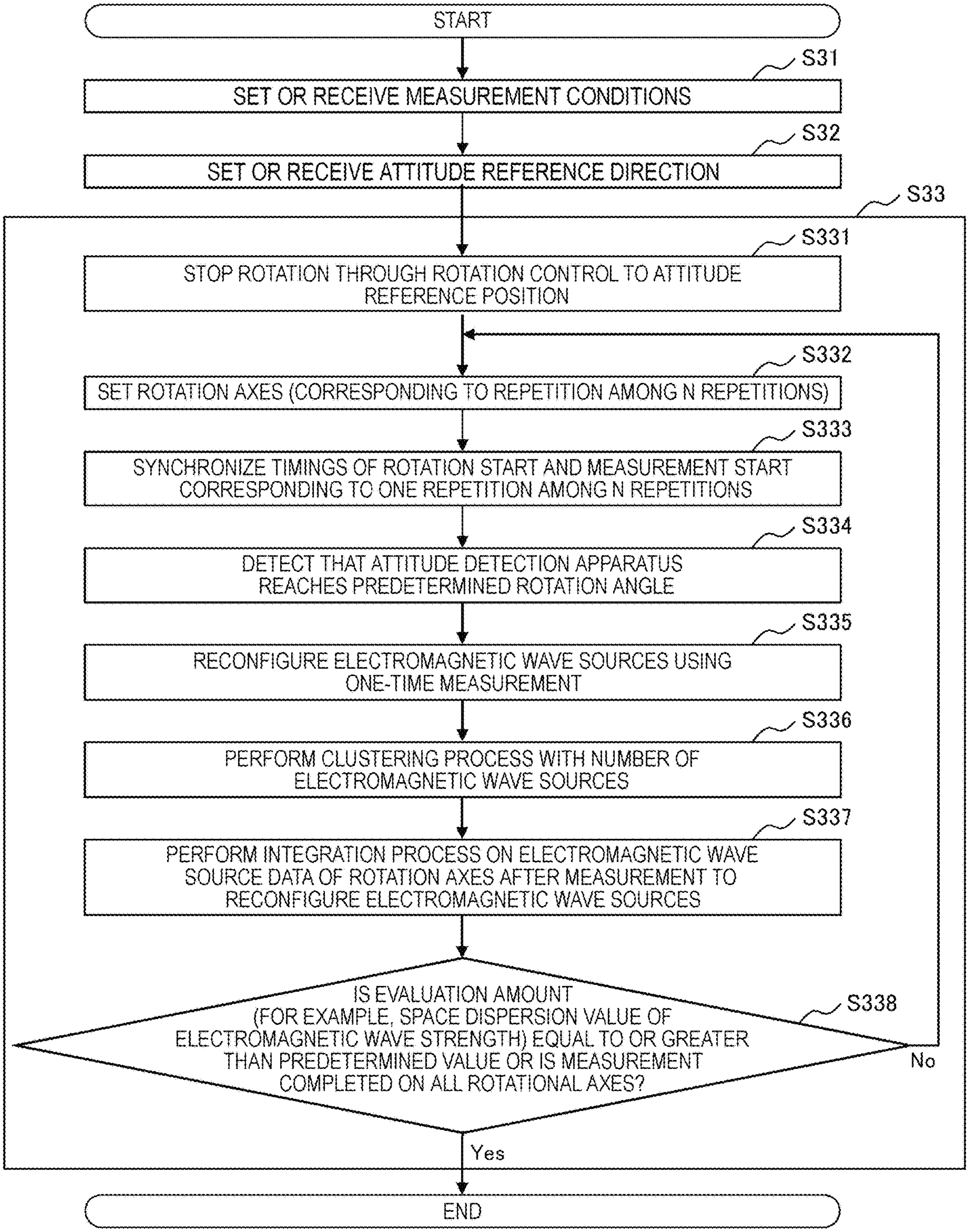
FIG. 22 is a flowchart illustrating an overview of processing content in the electromagnetic wave processing system and a calculation apparatus according to Embodiment 7 of the invention.

In Embodiment 7, a flowchart in which the number of rotation axes to be used is determined while determining a reconfiguration result will be described with reference to FIG. 22.

In a flow of FIG. 22, after processing steps S31 and S32 are performed, the process of processing step S33 is performed as follows. In the process, in processing step S331, the rotation is stopped through rotation control to an attitude reference position. In processing step S332, rotation axes corresponding to one repetition among N repetitions is set. In processing step S333, timings of rotation start and measurement start corresponding to one repetition among N repetitions are synchronized. In processing step S334, it is detected that the attitude detection apparatus reaches a predetermined rotation angle.

Subsequently, in processing step S335, the electromagnetic wave sources are reconfigured using one-time measurement. In processing step S336, a clustering process is performed with the number of electromagnetic wave sources. In processing step S337, an integration process is performed on electromagnetic wave source data of the rotation axes after the measurement to reconfigure the electromagnetic wave sources. Further, in processing step S338, it is determined whether an evaluation amount (for example, a space dispersion value of an electromagnetic wave intensity) is equal to or greater than a predetermined value or the measurement is completed on all the rotational axes. This process is repeatedly performed until the measurement is completed on all the rotational axes.

According to Embodiment 7, it is possible to determine the number of rotational axes to be used while determining a reconfiguration result.

What is claimed is:

1. An electromagnetic wave processing system mounted on a spacecraft including a plurality of antennas, the electromagnetic wave processing system comprising:

a measurement apparatus configured to process measurement signals of electromagnetic waves acquired by the plurality of antennas;

an attitude detection apparatus configured to detect an attitude of the spacecraft;

a rotation control apparatus configured to control rotation of the spacecraft; and a calculation apparatus, wherein the rotation control apparatus rotates the spacecraft about a center of gravity around a plurality of rotational axes with respect to an inertial space, wherein the measurement apparatus performs measurement at a plurality of attitudes changed by the rotation, and wherein the calculation apparatus calculates an intensity distribution of electromagnetic waves acquired by the plurality of antennas using an interference waveform obtained by multiplying measurement signals obtained from different antennas in the measurement signals obtained at the plurality of attitudes.

2. The electromagnetic wave processing system according to claim 1, wherein the intensity distribution is reconfigurable on a surface of a celestial sphere surface or a 2-dimensional map of an azimuth angle (azimuth)—an elevation angle (elevation).

3. The electromagnetic wave processing system according to claim 1, wherein an electromagnetic wave source is reconfigured from a time integration of a product of the interference waveform and a theoretical interference intensity (an interference fringe or a fringe pattern) assuming that there is a point radiation source at each position on a surface of a celestial sphere or a correlation map.

4. The electromagnetic wave processing system according to claim 3, wherein an input apparatus and a reception apparatus setting a shape or a size of an electromagnetic wave source is provided, and the electromagnetic wave source is reconfigured by deconvoluting the reconfigured electromagnetic wave source.

5. The electromagnetic wave processing system according to claim 1, wherein a measurement and rotation operation signal output apparatus is included, and a measurement start signal and a rotation start signal are synchronized and output after it is determined that an attitude of the spacecraft is still and in a predetermined reference attitude.

6. The electromagnetic wave processing system according to claim 5, wherein the measurement and rotation operation signal output apparatus outputs a measurement start signal after the number of rotations is a predetermined number of rotations and predetermined stability is determined to be maintained.

7. The electromagnetic wave processing system according to claim 1, wherein a speed of an electromagnetic wave source performing a relative motion with respect to the spacecraft is estimated.

8. The electromagnetic wave processing system according to claim 1, wherein a polarization direction of an electromagnetic wave radiated from the electromagnetic wave source is calculated.

9. The electromagnetic wave processing system according to claim 1, wherein a first antenna array having a first directivity pattern and a second antenna array having a second directivity pattern are provided, and wherein a target is tracked by using identification of a target electromagnetic wave source direction from substantially omnidirectional observation by the first antenna array and identification of a target electromagnetic wave source direction through highly accurate observation by the second antenna array in combination.

10. The electromagnetic wave processing system according to claim 1, wherein a plurality of mobile bodies performing formation flying are mounted and time synchronization is mutually performed to perform measurement in which a baseline length extends.

11. The electromagnetic wave processing system according to claim 1, wherein, when measurement is performed, a rotational axis to be used is selected from a plurality of rotational symmetric axes or the number of rotational axes are selected.

* * * * *